(12) United States Patent
Seok et al.

(10) Patent No.: US 12,508,752 B2
(45) Date of Patent: Dec. 30, 2025

(54) APPARATUS FOR MOLDING POUCH

(71) Applicant: LG Energy Solution, Ltd., Seoul (KR)

(72) Inventors: Heon Gi Seok, Daejeon (KR); Dae Hyung Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 134 days.

(21) Appl. No.: 18/283,179

(22) PCT Filed: Nov. 3, 2022

(86) PCT No.: PCT/KR2022/017130
§ 371 (c)(1),
(2) Date: Sep. 21, 2023

(87) PCT Pub. No.: WO2023/106641
PCT Pub. Date: Jun. 15, 2023

(65) Prior Publication Data
US 2024/0173900 A1 May 30, 2024

(30) Foreign Application Priority Data
Dec. 6, 2021 (KR) .................. 10-2021-0173290

(51) Int. Cl.
*B29C 43/58* (2006.01)
*B29C 43/02* (2006.01)
(Continued)

(52) U.S. Cl.
CPC ............ *B29C 43/58* (2013.01); *B29C 43/021* (2013.01); *B29C 43/04* (2013.01); *B29C 43/22* (2013.01);
(Continued)

(58) Field of Classification Search
None
See application file for complete search history.

(56) References Cited

U.S. PATENT DOCUMENTS 3,557,351 A * 1/1971 George .................. G01B 7/06
702/194
3,955,425 A * 5/1976 Corneau ............... G01B 17/02
73/625
(Continued)

FOREIGN PATENT DOCUMENTS

CN 112110188 A 12/2020
EP 2871442 A1 5/2015
(Continued)

OTHER PUBLICATIONS

Machine translation of KR 20150026172 A, FIT (Foreign Image and Text), Mar. 11, 2015 (Year: 2015).*
(Continued)

*Primary Examiner* — Benjamin A Schiffman
(74) *Attorney, Agent, or Firm* — Lerner David LLP

(57) ABSTRACT

An apparatus for molding a pouch, which includes: a transfer device configured to transfer a pouch film; a molding device configured to press a top surface of the pouch film to mold an accommodation part for accommodating an electrode assembly; and an inspection device configured to calculate a depth value of the accommodation part formed in the pouch film detect defects. The inspection device includes: a distance measuring member configured to measure a first measurement value and a second measurement value, and an inspection member configured to calculate a depth value of the accommodation part by subtracting the first measurement value from the second measurement value, wherein if the calculated depth value is within a set input value range, it is determined as normal, and if the calculated depth value is out of the set input value range, it is determined as defective.

10 Claims, 10 Drawing Sheets

(51) Int. Cl.
  *B29C 43/04* (2006.01)
  *B29C 43/22* (2006.01)
  *B29C 43/34* (2006.01)
  *H01M 10/04* (2006.01)
  *H01M 50/105* (2021.01)
  *B29C 43/32* (2006.01)
  *B29C 43/36* (2006.01)
  *B29L 31/34* (2006.01)
  *G01B 11/22* (2006.01)

(52) U.S. Cl.
  CPC ............ *B29C 43/34* (2013.01); *H01M 10/04* (2013.01); *H01M 10/0404* (2013.01); *H01M 50/105* (2021.01); *B29C 2043/3205* (2013.01); *B29C 2043/3613* (2013.01); *B29C 2043/5825* (2013.01); *B29C 2043/585* (2013.01); *B29C 2791/001* (2013.01); *B29C 2791/002* (2013.01); *B29C 2793/0027* (2013.01); *B29C 2793/009* (2013.01); *B29L 2031/34* (2013.01); *B29L 2031/3468* (2013.01); *G01B 11/22* (2013.01); *Y02E 60/10* (2013.01)

(56) References Cited

U.S. PATENT DOCUMENTS

| | | | | |
|---|---|---|---|---|
| 4,734,922 A * | 3/1988 | Harris | ...................... | B29C 48/08 425/141 |
| 6,315,150 B1 * | 11/2001 | Takai | ...................... | B29C 51/343 220/675 |
| 7,018,194 B2 * | 3/2006 | Kitamura | ............ | B30B 15/0017 425/219 |
| 7,980,542 B2 * | 7/2011 | Kawata | ...................... | B42C 1/12 270/32 |
| 8,333,372 B2 * | 12/2012 | Awaya | ................... | B65H 37/04 270/58.08 |
| 9,470,602 B2 * | 10/2016 | Yasooka | ............... | G01M 3/363 |
| 9,481,026 B2 * | 11/2016 | Ciocirlan | ............... | B21D 53/36 |
| 10,001,360 B2 * | 6/2018 | Kannaka | ................ | G01B 11/06 |
| 10,351,323 B2 * | 7/2019 | Mori | ...................... | B29D 22/00 |
| 10,479,016 B2 * | 11/2019 | Motosko | ................... | E04C 2/20 |
| 10,852,430 B2 * | 12/2020 | Aoyama | ................. | G01S 7/524 |
| 11,273,943 B2 * | 3/2022 | Taguchi | ................... | B65B 47/08 |
| 11,276,893 B2 * | 3/2022 | Kim, II | .............. | H01M 50/124 |
| 11,358,322 B2 * | 6/2022 | Kim | ...................... | B29C 51/262 |
| 11,539,090 B2 * | 12/2022 | Kang | ................. | H01M 50/105 |
| 12,100,827 B2 * | 9/2024 | Han | ......................... | B26F 1/44 |
| 2012/0247212 A1 * | 10/2012 | Knorr | ..................... | B29C 48/92 73/632 |
| 2015/0160004 A1 | 6/2015 | Lopez De Arbina Echeverria et al. | | |
| 2020/0331187 A1 | 10/2020 | Suh et al. | | |
| 2022/0271348 A1 * | 8/2022 | Kawamura | ......... | H01M 50/451 |
| 2023/0006239 A1 | 1/2023 | Song et al. | | |
| 2025/0018620 A1 * | 1/2025 | Lee | ......................... | B29C 43/12 |

FOREIGN PATENT DOCUMENTS

| | | |
|---|---|---|
| JP | 2004268934 A | 9/2004 |
| JP | 2009170134 A | 7/2009 |
| JP | 2012137473 A | 7/2012 |
| JP | 2016069800 A | 5/2016 |
| JP | 2020104127 A | 7/2020 |
| JP | 2021061227 A | 4/2021 |
| KR | 101397926 B1 | 5/2014 |
| KR | 20150026172 A | 3/2015 |
| KR | 101587554 B1 | 1/2016 |
| KR | 20170075454 A | 7/2017 |
| KR | 20170142050 A | 12/2017 |
| KR | 20180092174 A | 8/2018 |
| KR | 20190105765 A | 9/2019 |
| KR | 20200052061 A | 5/2020 |
| KR | 20200059615 A | 5/2020 |
| KR | 20200059618 A | 5/2020 |
| WO | 2021112481 A1 | 6/2021 |

OTHER PUBLICATIONS

Machine translation of KR 20190105765 A, FIT (Foreign Image and Text), Sep. 18, 2019 (Year: 2019).*
Machine translation of JP 2020104127 A, FIT (Foreign Image and Text), Jul. 9, 2020 (Year: 2020).*
Anonymous: "Importance of average: All About Circuits", Jan. 2018, Retrieved from the Internet: URL:http://forum.allaboutcircuits.com/threads/importance-of-average.144929/, 3 pages.
Extended European Search Report including Written Opinion for Application No. 22904475.5 dated Aug. 9, 2024, pp. 1-8.
International Search Report for PCT/KR2022/017130 mailed Feb. 10, 2023. 3 pages.

* cited by examiner

APPARATUS FOR MOLDING POUCH

CROSS-REFERENCE TO RELATED APPLICATION

The present application is a national phase entry under U.S.C. § 371 of International Application No. PCT/KR2022/017130 filed on Nov. 3, 2022, which claims the benefit of the priority of Korean Patent Application No. 10-2021-0173290, filed on Dec. 6, 2021, which is hereby incorporated by reference in its entirety.

TECHNICAL FIELD

The present disclosure relates to an apparatus for molding a pouch, in which an accommodation part for accommodating an electrode assembly is molded in a pouch film, and a depth of the accommodation part molded in the pouch film is accurately measured and inspected, and a method for molding the pouch.

BACKGROUND ART

In general, secondary batteries refer to chargeable and dischargeable batteries, unlike primary batteries that is impossible to charge. Such secondary batteries are widely used in high-tech electronic devices such as phones, notebook computers, and camcorders.

In addition, the secondary batteries may be variously classified according to a structure of an electrode assembly. For example, the secondary batteries may be classified into a stack type structure, a jelly-roll-type structure, and a stack/folding type structure.

Such a secondary battery includes an electrode assembly and a case accommodating the electrode assembly, and the electrode assembly has a structure in which electrodes and separators are alternately stacked.

A method for manufacturing the pouch includes a supply process of continuously supplying a pouch film, a molding process of continuously molding an accommodation part for accommodating an electrode assembly in the supplied pouch film, and a cutting process of cutting a portion between the accommodation parts, which are molded in the pouch film, to manufacture a finished product pouch.

Here, the method for manufacturing the pouch further includes an inspection process of measuring a depth of the accommodation part molded in the pouch film to inspect whether defects occur when the cutting process is completed, and in the inspection process, an worker inspects the depth of the accommodation part molded in the pouch film by using a ruler or a vernier caliper.

However, the inspection process has a problem in that a lot of work time is required. Particularly, it is difficult to obtain accurate inspection results due to measurement errors for each worker, and since the inspection has to be performed after the molding process is completed, there is a problem in that continuity of a work is poor.

DISCLOSURE OF THE INVENTION

Technical Problem

In an apparatus and method for molding a pouch of the present disclosure for solving the above problems, an inspection process of inspecting a depth of an accommodation part molded in a pouch film may be performed between a process of molding the pouch film and a process of cutting the pouch film, and the inspection process may accurately measure and inspect the depth of the accommodation part molded in the pouch film by using a displacement sensor to significantly reduce a work time and improve continuity of a work. In addition, an object of the present disclosure is to improve inspection accuracy because all the accommodation parts molded in the pouch film are capable of being inspected.

Technical Solution

An apparatus for molding a pouch according to the present disclosure for achieving the above objects includes: a transfer device configured to transfer a pouch film; a molding device configured to press a top surface of the pouch film transferred by the transfer device so as to mold an accommodation part for accommodating an electrode assembly; and an inspection device configured to calculate a depth value of the accommodation part formed in the pouch film and compare the calculated depth value with a set input value so as to inspect whether defects occur, wherein the inspection device includes: a distance measuring member provided at a reference point set above the pouch film to measure each of a first measurement value that is a distance from the reference point to the pouch film connected to an upper end of the accommodation part and a second measurement value that is a distance from the reference point to a bottom surface of the accommodation part; and an inspection member configured to calculate a depth value of the accommodation part by subtracting the first measurement value from the second measurement value measured by the distance measuring member, wherein if the calculated depth value is within a set input value, it is determined as normal, and if the calculated depth value is out of the set input value, it is determined as defective.

The distance measuring member may be provided as a displacement sensor.

The distance measuring member may measure the distance from the reference point to the pouch film connected to an upper end of the accommodation part several times within a set range to calculate the first measurement value as an average of the measured distance values.

The distance measuring member may measure the distance from the reference point to the bottom surface of the accommodation part several times within a set range to calculate the second measurement value as an average of the measured distance values.

The set range may be set to 1 mm to 5 mm.

The inspection device may further include a full-width adjusting member configured to allow the distance measuring member to move in a full-width direction of the pouch film, which is perpendicular to a transfer direction of the pouch film, so as to adjust a position of the distance measuring member.

The inspection device may further include a height adjusting member configured to allow the full-width adjusting member to move toward the pouch film so as to adjust a height of the distance measuring member with respect to the pouch film.

A method for molding a pouch according to the present disclosure includes: a transfer process of transferring a pouch film; a molding process of pressing a top surface of the transferred pouch film to mold an accommodation part for accommodating an electrode assembly; and an inspection process of calculating a depth value of the accommodation part formed in the pouch film and comparing the calculated depth value with a set input value to inspect whether defects occur, wherein the inspection process includes: a measuring process of measuring each of a first measurement value that is a distance from a reference point to the pouch film connected to an upper end of the accommodation part and a second measurement value that is a distance from the reference point to a bottom surface of the accommodation part by using a distance measuring member provided above the pouch film; and an inspecting process of calculating a depth value of the accommodation part by subtracting the first measurement value from the second measurement value measured in the measuring process, wherein if the calculated depth value is within a set input value, it is determined as normal, and if the calculated depth value is out of the set input value, it is determined as defective.

In the measuring process, the distance measuring member may be provided as a displacement sensor.

In the measuring process, the distance from the reference point to the pouch film connected to an upper end of the accommodation part may be measured several times within a set range to calculate the first measurement value as an average of the measured distance values.

In the measuring process, the distance from the reference point to the bottom surface of the accommodation part may be measured several times within a set range to calculate the second measurement value as an average of the measured distance values.

The set range may be set to 1 mm to 5 mm.

The measuring process may further include a process of allowing the distance measuring member to move in a full-width direction of the pouch film, which is perpendicular to a transfer direction of the pouch film, so as to adjust a position of the distance measuring member.

The measuring process may further include a process of allowing the full-width adjusting member to move toward the pouch film so as to adjust a height of the distance measuring member with respect to the pouch film.

The method may further include, after the inspection process is completed, a cutting process of cutting a portion between the accommodation parts formed in the pouch film to manufacture the pouch; and a removing process of discharging and removing the pouch, in which the accommodation part determined as defective in the inspection process, among the pouches is formed.

Advantageous Effects

The molding apparatus of the present disclosure may include the displacement sensor to accurately measure and inspect the depth of the accommodation part molded in the pouch film, thereby significantly reducing the work time and improving the continuity of the work. Particularly, the molding apparatus of the present disclosure may inspect all the accommodation parts molded in the pouch film to obtain the accurate inspection results.

MODE FOR CARRYING OUT THE INVENTION

Figure 1:
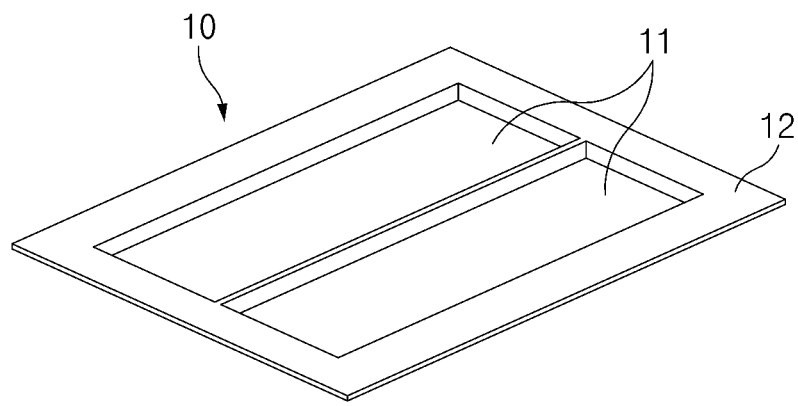
FIG. 1 is a perspective view illustrating a pouch according to an embodiment of the present invention.

Hereinafter, embodiments of the present invention will be described in detail with reference to the accompanying drawings in such a manner that the technical idea of the present disclosure may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Pouch of Present Disclosure]

As illustrated in FIG. 1, a pouch 10 of the present disclosure is configured to accommodate an electrode assembly (not shown). That is, the pouch 10 includes an accommodation part 11 accommodating the electrode assembly and a sealing part 12 sealing the accommodation part 11.

The pouch 10 may be manufactured by molding a pouch film 20. That is, when the accommodation part 11 provided with a pair of accommodation grooves for accommodating the electrode assembly may be molded in a top surface of the pouch film 20, and when the pouch film 20 is folded in half so that the pair of accommodation grooves correspond to each other, the pouch 10 capable of accommodating the electrode assembly may be manufactured.

The pouch 10 having such a structure may be manufactured through the apparatus for molding the pouch according to the present disclosure. Particularly, the apparatus for molding the pouch according to the present disclosure may accurately inspect whether the accommodation part 11 formed in the pouch film 20 is defective in the process of manufacturing the pouch. Thus, a work time may be significantly shortened, and continuity of the work may be improved, and thus, all the accommodation parts 11 formed in the pouch film 20 may be inspected to obtain accurate inspection results.

[An Apparatus for Molding Pouch According to the Present Disclosure]

Figure 2:
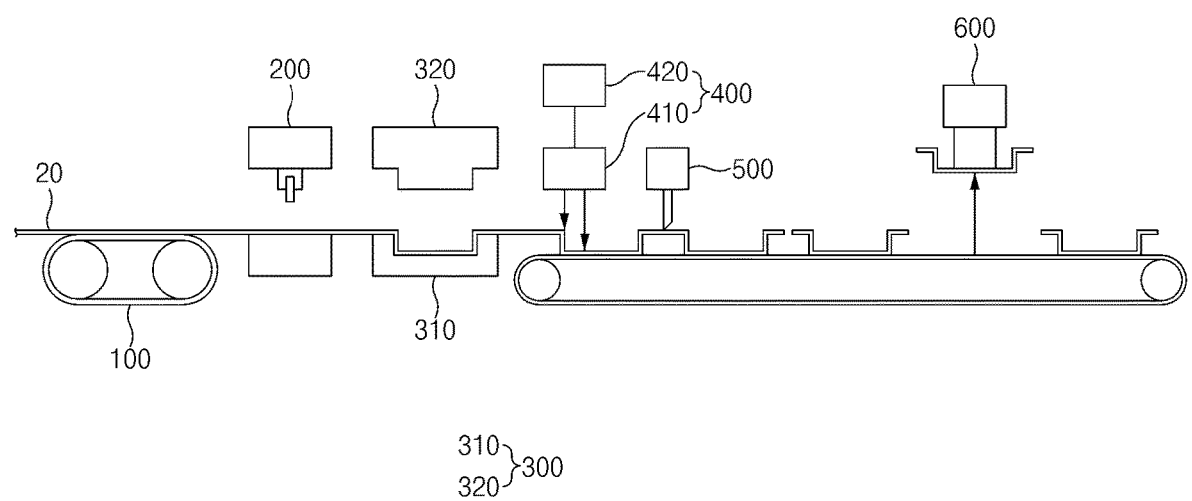
FIG. 2 is a schematic process view illustrating an apparatus for molding the pouch according to an embodiment of the present invention.

For example, as illustrated in FIG. 2, an apparatus for molding a pouch according to the present disclosure includes a transfer device 100, a slit cutting device 200, a molding device 300, an inspection device 400, a main cutting device 500, and a removing device 600.

Transfer Device

As illustrated in FIG. 2, the transfer device 100 is configured to transfer a pouch film 20 having a long sheet shape up to the main cutting device 500 via the slit cutting device 200, the molding device 300, and the inspection device 400. That is, the transfer device 100 may be provided as a conveyor belt, on which the pouch film 20 is disposed on a top surface thereof, and which transfers the pouch film 20 up to the slit cutting device 200.

Slit Cutting Device

Figure 3:
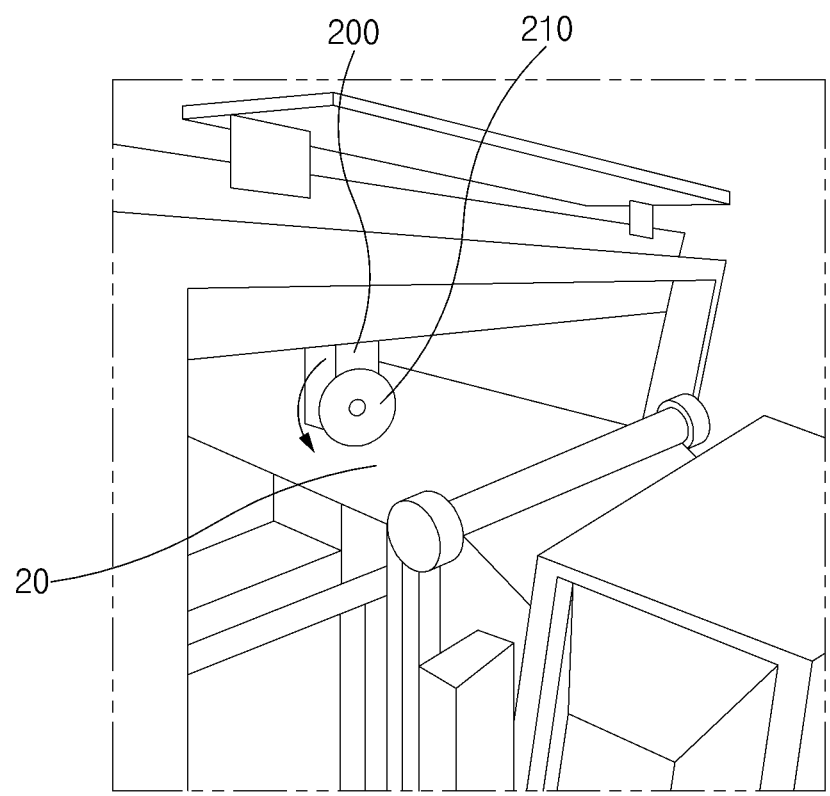
FIG. 3 is a perspective view illustrating a slit cutting device of the apparatus for molding the pouch according to an embodiment of the present invention.

As illustrated in FIG. 3, the slit cutting device 200 is configured to cut a portion between the accommodation parts to be formed to improve efficiency and cutting performance when the pouch film is cut. That is, the slit cutting device 200 includes a rotating blade 210 that cuts a portion of the pouch film 20 in a full-width direction when viewed in FIG. 4.

Molding Device

Figure 4:
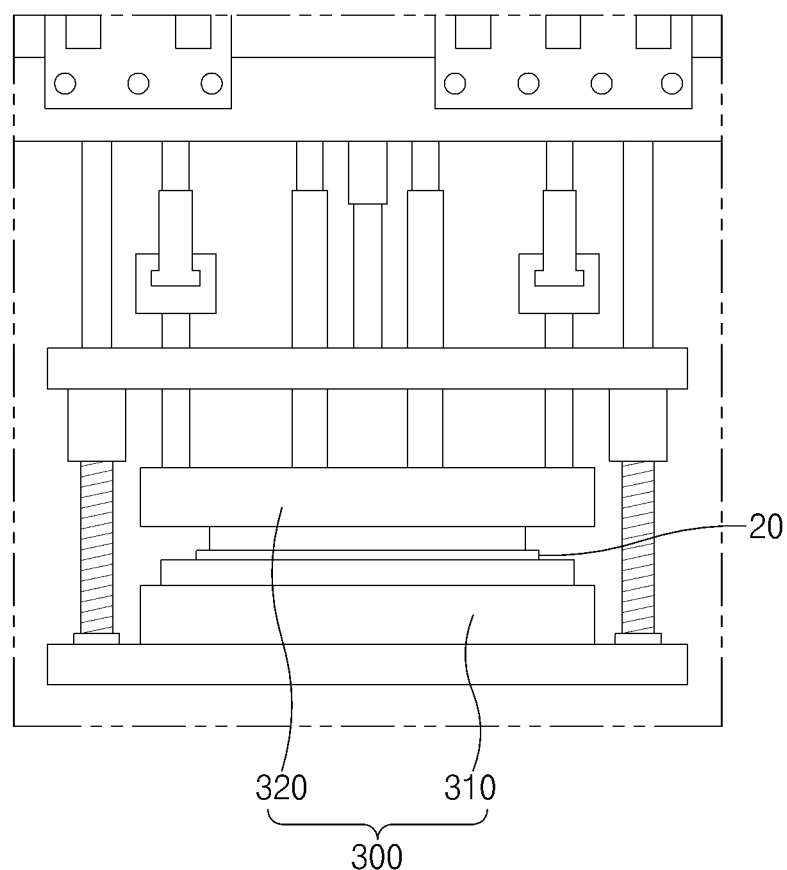
FIG. 4 is a perspective view illustrating a molding device of the apparatus for molding the pouch according to an embodiment of the present invention.

As illustrated in FIG. 4, the molding device 300 is configured to press the top surface of the transferred pouch film 20 so as to form an accommodation part for accommodating the electrode assembly. That is, the molding device 300 includes a die 310, on which the pouch film 20 is disposed, and a punch provided above the die 310 to press the top surface of the pouch film 20 so as to mold the electrode assembly accommodation part 11.

In the pouch film 20 in which the accommodation part 11 is formed by the molding device 300, a depth of the accommodation part 11 may be changed due to restoring force, and the accommodation part 11 formed in the pouch film 20 may need to be inspected in whether a change in depth of the accommodation part 11 formed in the pouch film 20 occurs. Here, the inspection device 400 is used.

Inspection Device

Figure 5:
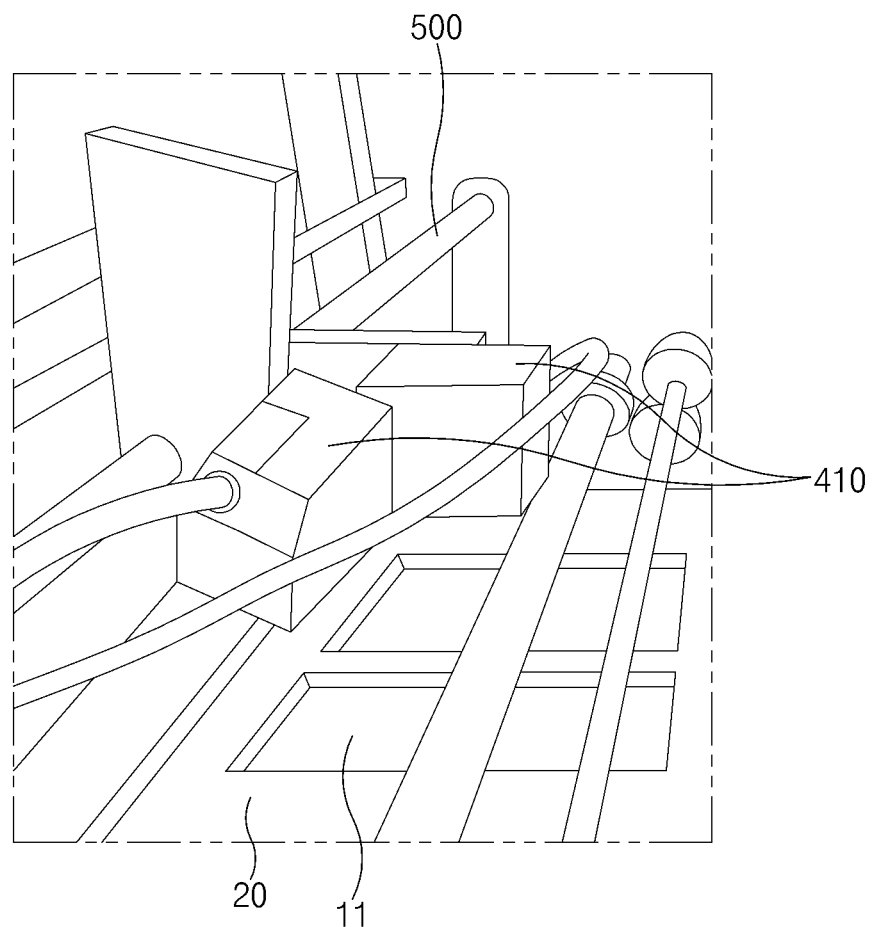
FIG. 5 is a perspective view illustrating a distance measuring member of the apparatus for molding the pouch according to an embodiment of the present invention.
Figure 6:
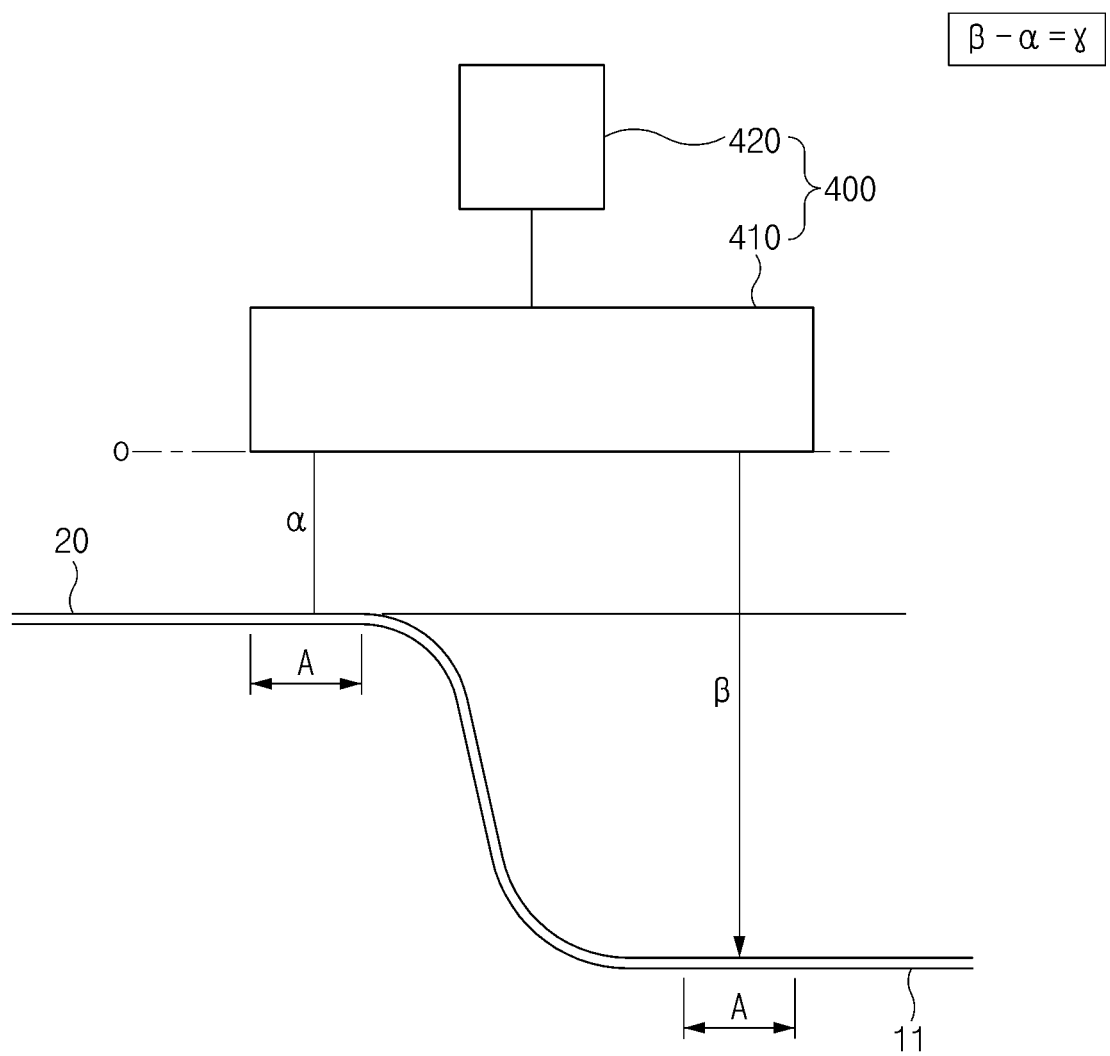
FIG. 6 is a view illustrating a distance measurement state of the distance measuring member.

As illustrated in FIGS. 5 and 6, the inspection device 400 is configured to inspect the depth of the accommodation part 11 formed in the pouch film 20 to determine whether detects occur. That is, the inspection device 400 calculates a depth value of the accommodation part 11 formed in the pouch film 20 and compares the calculated depth value with an set input value to inspect whether the defects occur.

For example, the inspection device 400 includes a distance measuring member 410 and an inspection member 420.

The distance measuring member 410 is provided at a reference point O set above the pouch film 20 to measure a first measurement value α that is a distance from the reference point to the pouch film 20 connected to an upper end of the accommodation part 11 and a second measurement value β that is a distance from the reference O to a bottom surface of the accommodation part 11.

The inspection member 420 calculates a depth value γ of the accommodation part 11 by subtracting the first measurement value α from the second measurement value β measured by the distance measuring member 410, and then if the calculated depth value is within the set input value range, it is determined as normal, and if it is out of the range, it is determined as defective.

The formula for calculating the depth value (γ) is (β)−(α)=(γ).

The depth value γ of the accommodation part 11 and the set input value may vary depending on a size and thickness of the electrode assembly to be accommodated in the pouch film 20.

Here, the distance measuring member 410 may be provided as a displacement sensor, and the first measurement value α and the second measurement value β may be accurately measured through the displacement sensor. The displacement sensor is a sensor used to measure a linear distance or a linear position moved by an object, and includes a laser displacement sensor.

The distance measuring member 410 measures the linear distance from the reference point to the pouch film 20 connected to the upper end of the accommodation part 11, e.g., measures the linear distance several times within a set range A partitioned in the pouch film 20 to calculate a first measure value as an average of the measured distance values. For example, the distance measuring member 410 may measure the linear distance from the reference point to the set range A partitioned in the pouch film 20 four or more times to calculate a first measurement value as an average of remaining values excluding maximum and minimum values among the measured distance values.

The distance measuring member 410 measures the linear distance from the reference point to the bottom surface of the accommodation part 11, e.g., measures the linear distance several times within the set range partitioned on the bottom surface of the accommodation part 11 to calculate a second measurement value as an average of the measured distance values. For example, the distance measuring member 410 may measure the linear distance from the reference point to the bottom surface of the accommodation part 11 of the pouch film 20 four or more times to calculate a second measurement value as an average of remaining values excluding maximum and minimum values among the measured distance values.

The set range A may be set to 1 mm to 5 mm, preferably set to 2 mm to 3 mm. Here, if the set range A is 1 mm or less, a distance value of the same position may be measured, and if the set range A is 5 mm or more, moving force of the distance measuring member 410 is greatly required, resulting in poor performance of the molding apparatus.

Therefore, the inspection device 400 may accurately inspect the depth of the accommodation part 11 formed in the pouch film 20 during the molding process of the pouch film 20 to determine whether defects occur, thereby improving efficiency continuity of the work.

Figure 7:
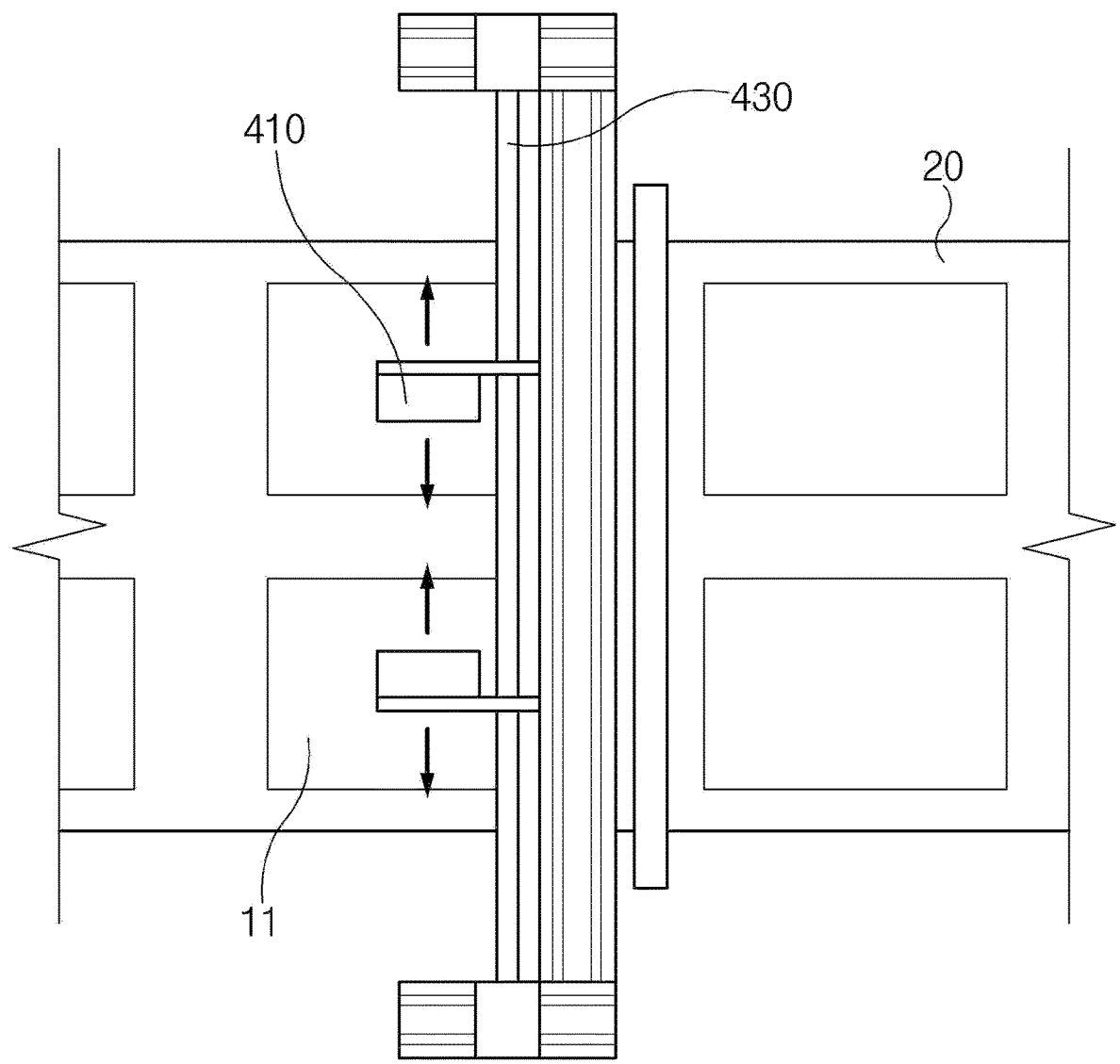
FIG. 7 is a side view illustrating a full-width adjusting member of the apparatus for molding the pouch according to an embodiment of the present invention.

As illustrated in FIG. 7, the inspection device 400 may further include a full-width adjusting member 430 that allows the distance measuring member 410 to move in a full-width direction (left and right direction of the pouch film 20 when viewed in FIG. 5) of the pouch film 20, which is perpendicular to a transfer direction of the pouch film 20 so as to adjust a position of the distance measuring member 410.

That is, the full-width adjusting member 430 is configured to adjust the position of the distance measuring member 410 in the full-width direction of the pouch film 20. The full-width adjusting member 430 may be provided as a guide rod provided in the full-width direction of the pouch film 20 and movably coupled to the distance measuring member 410. That is, when the distance measuring member 410 move in a longitudinal direction of the guide rod, the position of the distance measuring member 410 may be adjusted while moving in the full-width direction of the pouch film 20.

Figure 8:
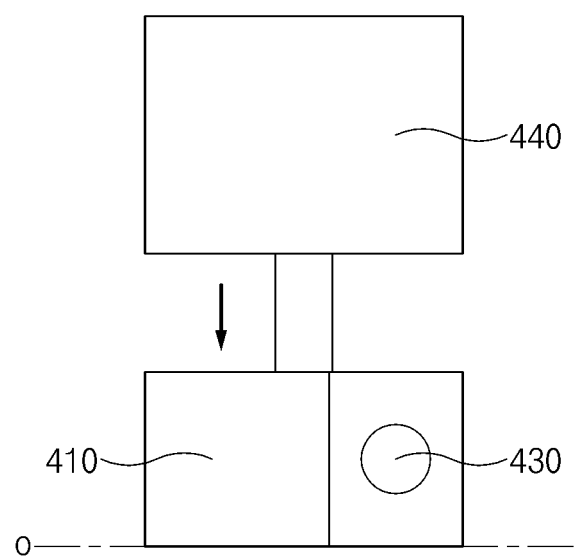
FIG. 8 is a side view illustrating a height adjusting member of the apparatus for molding the pouch according to an embodiment of the present invention.

As illustrated in FIG. 8, the inspection device 400 may further include a height adjusting member 440 that allows the full-width adjusting member 430 to move to the pouch film 20 so as to adjust a height of the distance measuring member 410 fixed to the full-width adjusting member 430 with respect to the pouch film 20. That is, the height adjusting member 440 may be provided as a cylinder that allows the full-width adjusting member 430 to descend toward the pouch film 20. Thus, the distance measuring member 410 may be accurately aligned with the set reference point, and as a result, the accurate first and second measurement values may be obtained.

Main Cutting Device

Figure 9:
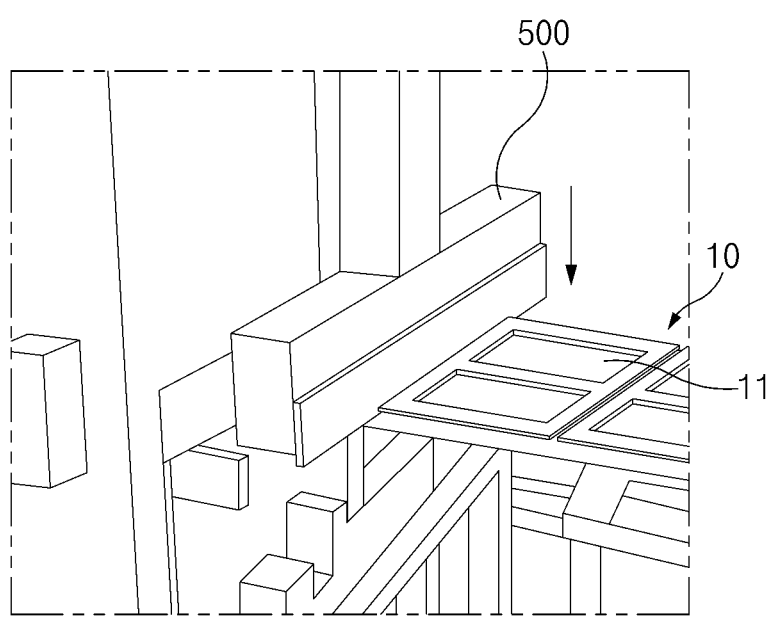
FIG. 9 is a perspective view illustrating a main cutting device of the apparatus for molding the pouch according to an embodiment of the present invention.

As illustrated in FIG. 9, the main cutting device 500 cuts a portion between the accommodation parts 11 of the pouch film 20 passing through the inspection device 400 to manufacture a pouch. Here, the cutting device may cut the pouch film 20 in the full-width direction based on a cutting surface that is cut on the pouch film 20 by the slit cutting device 200 to improve cutting accuracy.

The apparatus for molding the pouch according to the present disclosure may further include a removing device, which removes the pouch having the accommodation part 11 determined as defective by the inspection device 400 among the pouches cut by the main cutting device 500, in a process line.

Removing Device

When the pouch having the accommodation part 11 determined as defective by the inspection device 400 is cut, the removing device 600 may absorb and remove the pouch having the defective accommodation part 11 in the process line. Thus, it is possible to prevent defective pouch from being transferred to the process line for manufacturing a secondary battery.

Therefore, the apparatus for molding the pouch according to the present disclosure may inspect whether the accommodation part 11 formed in the pouch film 20 is defective in the process of manufacturing the pouch, thereby reducing the work time and improving the continuity of the work.

Hereinafter, a method for molding a pouch using an apparatus for molding the pouch according to the present disclosure will be described.

[Method for Molding Pouch According to the Present Disclosure]

Figure 10:
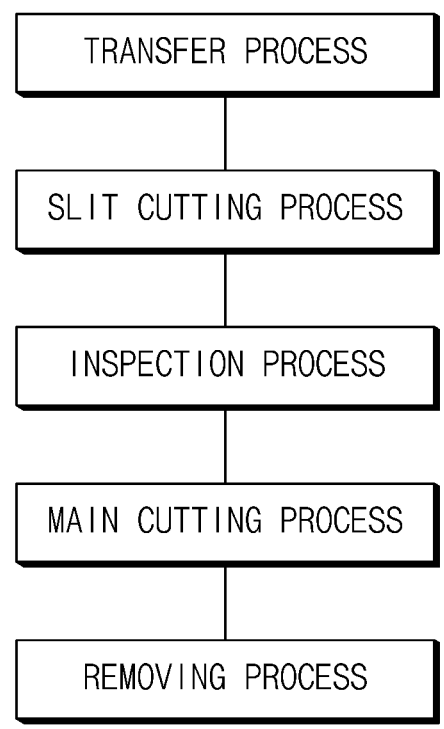
FIG. 10 is a flowchart illustrating a method for molding a pouch according to an embodiment of the present invention.

As illustrated in FIG. 10, the method for molding the pouch according to the present disclosure may include a transfer process, a slit cutting process, a molding process, an inspection process, a main cutting process, and a removing process.

In the transfer process, referring to FIG. 2, a pouch film 20 in the form of a long sheet is transferred to the molding process using a conveyor belt, which is a transfer device 100.

Referring to FIG. 3, in the slit cutting process, a portion of the space between accommodation parts to be formed in the pouch is cut using the slit cutting device 200.

In the molding process, a top surface of the pouch film 20 is pressed by a molding device 300 to form the accommodation part 11 for accommodating an electrode assembly. Here, the molding device 300 continuously molds the accommodation part 11 at regular intervals on the top surface of the pouch film 20 being transferred. That is, when the pouch film 20 is disposed on the die 310, the molding device 300 presses the top surface of the pouch film 20 while the punch 320 descends to mold the accommodation part 11 for accommodating the electrode assembly.

In the inspection process, a depth value of the accommodation part 11 formed in the pouch film 20 is calculated, and the calculated depth value is compared with a set input value to inspect whether defects occur. That is, the inspection process includes a measuring process and an inspecting process. Here, an inspection device 400 provided with a distance measuring member 410 and an inspection member 420 is used.

In the measuring process, a first distance value that is a linear distance at a right angle from a reference point to the pouch film 20 connected to an upper end of the accommodation part 11 and a second distance value that is a linear distance at a right angle from the reference point to a bottom surface of the accommodation part 11 are measured using the distance measuring member 410 provided above the pouch film 20.

Here, in the measuring process, the distance from the reference point to the pouch film 20 connected to the upper end of the accommodation part 11 may be measured several times within a set range A using the distance measuring member 410 to calculate a first measurement value as an average of the measured distance values.

In addition, in the measuring process, the distance from the reference point to a bottom surface of the accommodation part 11 may be measured several times within the set range A using the distance measuring member 410 to calculate a second measurement value as an average of the measured distance values.

The sett range A may be set to 1 mm to 5 mm.

The measuring process may further include a process of allowing the distance measuring member 410 to move in a full-width direction of the pouch film 20, which is perpendicular to a transfer direction of the pouch film 20, so as to adjust a position of the distance measuring member 410. Thus, measurement accuracy may be improved by adjusting the position of the distance measuring member 410 in the full-width direction of the pouch. In addition, in the measuring process, the distance measuring member 410 may descend toward the pouch film 20 to adjust a height of the distance measuring member 410 with respect to the pouch film 20. Thus, the height of the distance measuring member 410 may be adjusted to match the reference point.

In the inspecting process, a depth value of the accommodation part 11 is calculated by subtracting the first measurement value from the second measurement value measured in the measuring process using the inspection member 420, and then if the calculated depth value is within the set input value range, it is determined as normal, and if it is out of the range, it is determined as defective.

The distance measuring member 410 may be provided as a displacement sensor, and thus, the first and second measurement values may be accurately measured.

In the main cutting process, the pouch film 20 between the accommodation parts 11, in which the inspecting process is performed, is cut using the main cutting device 500 to manufacture the pouch 10. Here, the pouch film 20 is cut based on a cutting portion of the pouch film 20, which is formed in the slit cutting process.

In the removing process, the pouch having the accommodation portion 11 determined to be defective among the pouches cut by the main cutting process may be adsorbed using the removing device 600 and then removed in a process line. Thus, it is possible to prevent the defective pouches from being transferred to an assembly line for assembling a secondary battery.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

10: Pouch
20: Pouch film
11: Accommodation part

12: Sealing part
100: Transfer device
200: Slit cutting device
210: Rotating blade
300: Molding device
310: Die
320: Punch
400: Inspection device
410: Distance measuring member
420: Inspection member
430: Full-width adjusting member
440: Height adjusting member
500: Main cutting device
600: Removing device

The invention claimed is:

1. An apparatus for molding a pouch, comprising:
an inspection device configured to calculate a depth value of an accommodation part formed in a pouch film and compare the calculated depth value with a set input value range so as to inspect for defects, and
a removing device configured to remove the pouch having the accommodation part determined as defective by the inspection device,
wherein the inspection device comprises:
a distance measuring member positioned at a reference point set above the pouch film to measure each of a first measurement value of a first distance from the reference point to the pouch film connected to an upper end of the accommodation part and a second measurement value of a second distance from the reference point to a bottom surface of the accommodation part; and
an inspection member configured to calculate a depth value of the accommodation part by subtracting the first measurement value from the second measurement value, wherein upon determining that the depth value is outside of the set input value range, the removing device removes the pouch determined to have a defect.

2. The apparatus of claim 1, wherein the distance measuring member is a displacement sensor.

3. The apparatus of claim 1, wherein the distance measuring member measures the first distance several times within a set range to calculate the first measurement value as an average of the measurements of the first distance.

4. The apparatus of claim 3, wherein the set range is set to 1 mm to 5 mm.

5. The apparatus of claim 1, wherein the distance measuring member measures the second distance several times within a set range to calculate the second measurement value as an average of the measurements of the second distance.

6. The apparatus of claim 5, wherein the set range is set to 1 mm to 5 mm.

7. The apparatus of claim 1, wherein the inspection device further comprises a full-width adjusting member configured to allow the distance measuring member to move in a full-width direction of the pouch film, which is perpendicular to a transfer direction of the pouch film, so as to adjust a position of the distance measuring member.

8. The apparatus of claim 7, wherein the inspection device further comprises a height adjusting member configured to allow the full-width adjusting member to move toward the pouch film so as to adjust a height of the distance measuring member with respect to the pouch film.

9. The apparatus of claim 1, further comprising a transfer device configured to transfer the pouch film.

10. The apparatus of claim 1, further comprising a molding device configured to press a top surface of the pouch film into a mold to form the accommodation part for accommodating an electrode assembly.

* * * * *